Jan. 16, 1962   S. VERNET   3,016,747
SQUEEZE-PUSH POWER ELEMENT
Filed Nov. 28, 1956   4 Sheets-Sheet 3
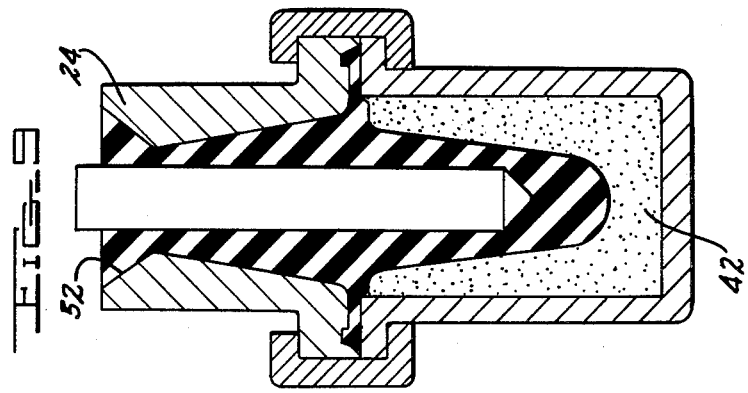
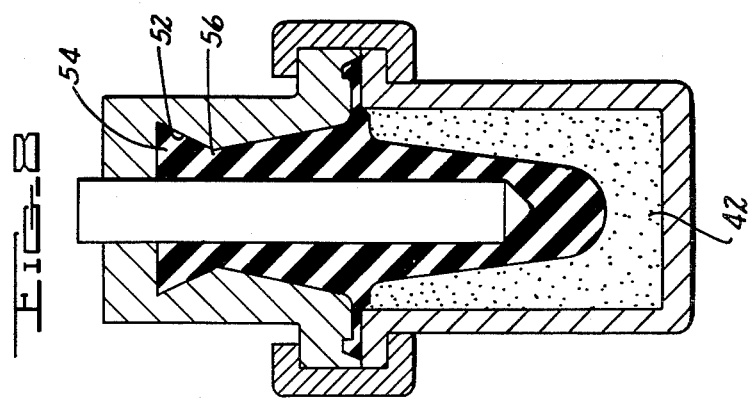
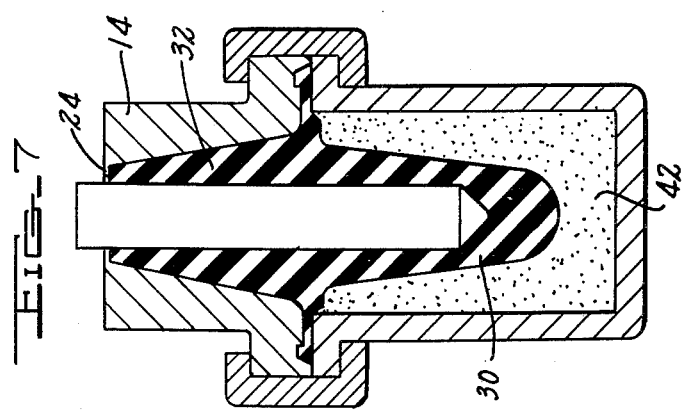
INVENTOR
SERGIUS VERNET
BY Smith, Olsen, Lewis & McRae
ATTORNEYS

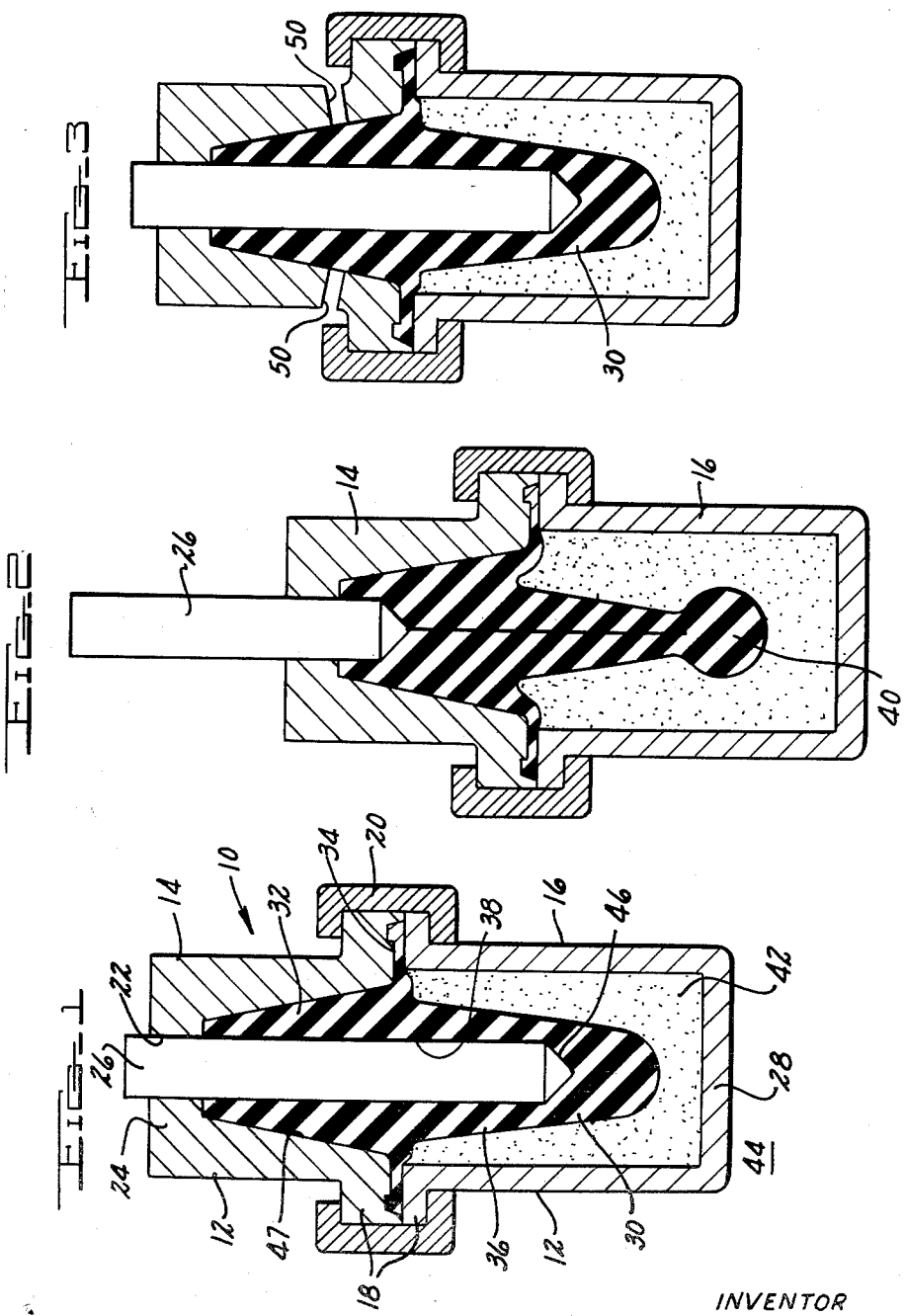

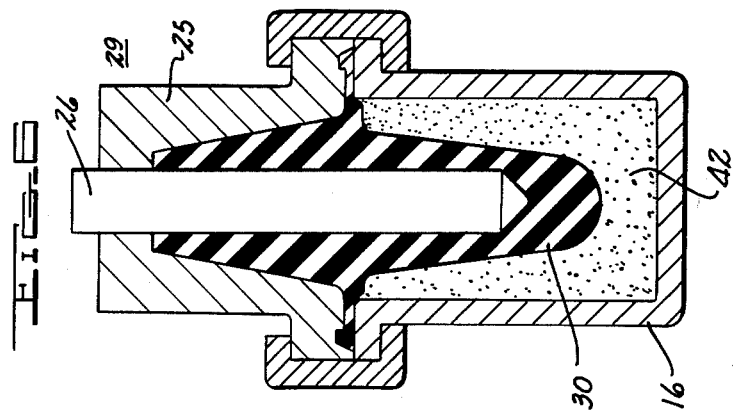
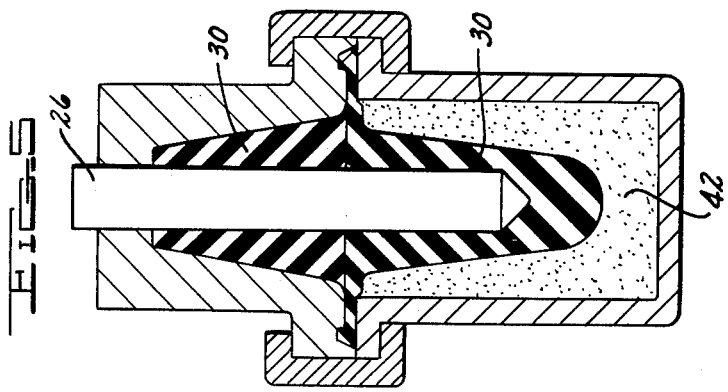
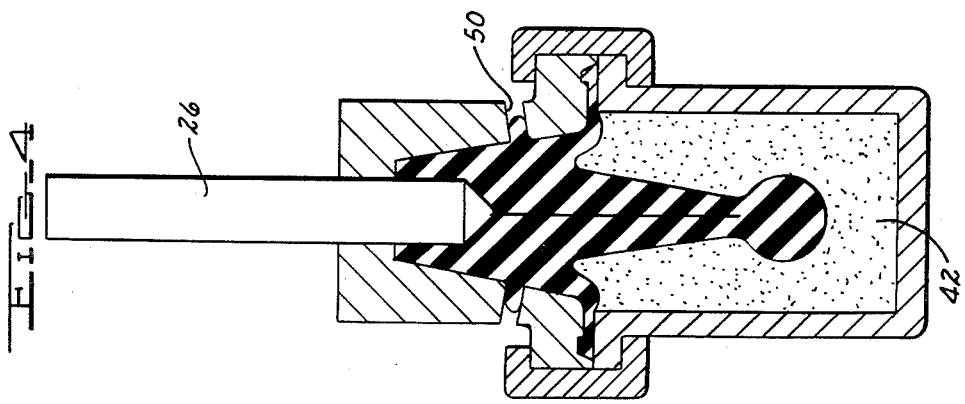

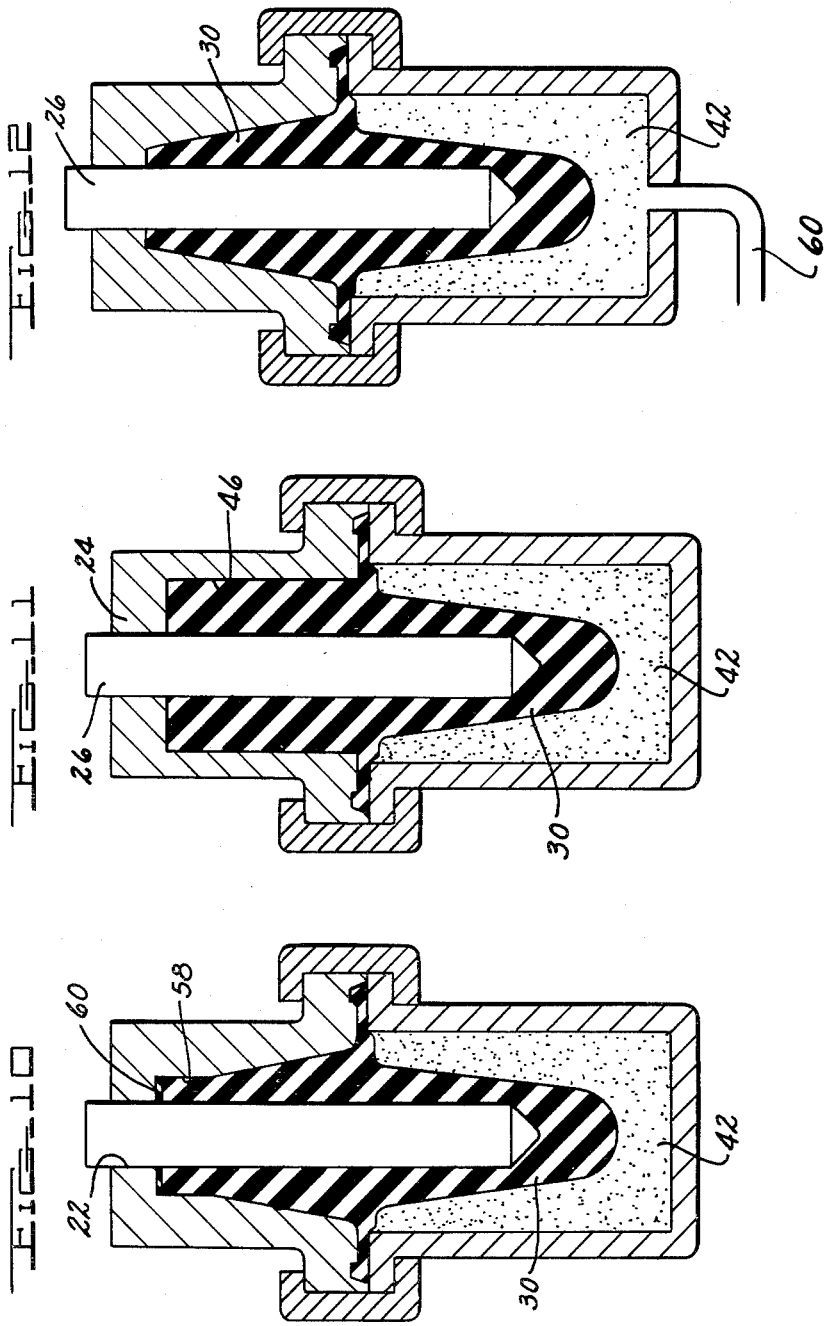

3,016,747
SQUEEZE-PUSH POWER ELEMENT
Sergius Vernet, Yellow Springs, Ohio, assignor to Antioch College, Yellow Springs, Ohio, a corporation of Ohio
Filed Nov. 28, 1956, Ser. No. 624,871
3 Claims. (Cl. 73—368.3)

This invention relates to power elements of the type which are operated by pressure changes of a contained pressure-producing material. The pressure-producing material may be a thermally expansible material or a hydraulic material. Power elements of this type are useful for operating such devices as switches and valves.

Objects of the invention are, singly and collectively, to provide a power element wherein:

(1) the element has a comparatively long movement distance in relation to its axial dimension, (2) the "long movement distance" feature is attained without parts jamming or improper guiding of the moving component, (3) the power element component parts are capable of manufacture as low cost items, (4) the efficiency "in terms of motion produced per pressure input" is relatively high, (5) the power element has an improved seal construction for preventing flow of ambient media into the element, (6) the power element casing may, if desired, be of porous character; whereby any ambient media which might tend to be trapped in the element would automatically be forced out through the pores by pressure developed within the element, (7) power element overtravel is controlled in such manner as to prevent parts breakage, (8) tendency of the power element sealing and force-transmitting structures to rupture in service is decreased.

Other objects of this invention will appear in the following description and appended claims, reference being had to the accompanying drawings forming a part of this specification wherein like reference characters designate corresponding parts in the several views.

In the drawings:

FIG. 1 is a sectional view through one embodiment of the invention, taken with the power element piston at the limit of its "in-stroke."

FIG. 2 is a sectional view of the FIG. 1 embodiment, taken with the power element piston at the limit of its "out-stroke."

FIG. 3 is a sectional view of a second embodiment of the invention, taken with the power element piston at the limit of its "in-stroke."

FIG. 4 is a sectional view of the FIG. 3 embodiment, taken with the power element piston at the limit of its "out-stroke."

FIG. 5 is a sectional view through another embodiment of the invention.

FIG. 6 is a sectional view through another embodiment of the invention.

FIG. 7 is a sectional view through another embodiment of the invention.

FIG. 8 is a sectional view through another embodiment of the invention.

FIG. 9 is a sectional view through another embodiment of the invention.

FIG. 10 is a sectional view through another embodiment of the invention.

FIG. 11 is a sectional view through another embodiment of the invention.

FIG. 12 is a sectional view through still another embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIGS. 1 and 2 there is shown a power element 10 comprising a metal container 12 formed by two facing cup members 14 and 16. Each of the cup members is provided with a peripheral flange 18 at its mouth, and a retainer ring 20 is clamped over these flanges to retain the cup members in fixed positions relative to one another.

Cup member 14 is provided with an opening 22 in its end wall 24, and a piston 26 is extended through the opening to a point adjacent end wall 28 of cup member 16. Surrounding piston 26 is a body of force-transmitting material 30 formed of vulcanized rubber or other similar deformable material. Body 30 includes an annular plug portion 32 fitting within cup member 14. An annular rim portion 34 extends from plug portion 32 into a clamped position between flanges 18, 18. The construction of flanges 18 and rim portion 34 is similar to that of the corresponding parts in the FIG. 7 structure of U.S. Patent No. 2,636,776.

Force-transmitting body 30 includes a sleeve portion 36 extending from the lower limit of plug portion 32. The plug and sleeve portions combine to define a bore 38. Initially bore 38 is made about .002 inch undersize with respect to the piston diameter. As a result, when piston 26 is assembled into bore 38 the sleeve and plug portions tightly fit against the piston. The lowermost end portion 40 of the sleeve is somewhat enlarged with respect to the immediately superjacent sleeve portion, whereby the lowermost end of the sleeve is protected against rupture. Also, the sleeve portion is of gradually diminishing radial thickness in directions downwardly from the plug portion. This "gradually diminishing thickness" feature serves to thicken the sleeve in those sections subject to the most stress, and thereby serves to prevent rupture of the sleeve.

Within cup member 16 is a thermally-expansible, pressure-producing material 42 which may be any of several materials, as for example paraffin or the thermal materials disclosed in U.S. Patent No. 2,259,846. The exact nature of material 42 is determined in accordance with the desired operating characteristics of the power element.

In operation of the power element, piston 26 takes the FIG. 1 position when material 42 is at a temperature below its expansion temperature range. When the temperature of ambient medium 44 rises sufficiently material 42 heats up so as to expand and exert a radial "squeezing" pressure against sleeve 36. This radial squeezing pressure is transmitted through sleeve 36 to the conical surface 46 of piston 26 so as to force the piston upwardly in bore 38. This "squeezing" action on sleeve 36 is effective to move the piston until the lower end of the piston reaches a point within plug portion 32 about on a line with rim portion 34. Thereafter, continued heating of material 42 causes the expansion pressure of material 42 to be exerted vertically upward on plug portion 32. At least a portion of this upward pressure is directed upwardly against surface 46 so as to push the piston toward its FIG. 2 position.

In this connection, as the piston moves up on bore 38 it leaves a free space into which part of the plug portion can shift. As a result there is an actual bodily displacement of the plug in an upward direction.

It will be noted that surfaces 47 of cup member 14 converge toward one another as they lead away from cup member 16. This convergence causes part of the upward pressure on plug portion 32 to be redirected radially against conical surface 46 so as to aid in moving the piston toward its FIG. 2 position.

When the temperature of medium 44 decreases material 42 is cooled so as to decrease its volumetric displacement. As a result the upward pressure on the piston is decreased sufficiently to allow a spring (not shown) to return the piston toward its FIG. 1 position. The spring may act directly on the piston or it may act indirectly thereon in the manner of spring 24 in U.S. Patent No. 2,636,776.

The piston has a very limited engagement with end wall 24 during its reciprocating movement. However the "rigid positioning" of plug portion 32 between the piston and cup member surfaces 47 prevents any "canting" or improper guiding of the piston. In this connection, plug portion 32 serves the double function of force-transmitter and piston guide. Because of the disposition of plug portion 32 around the piston the piston can be made to have a relatively long stroke in relation to the length of the power element without danger of piston jamming. End wall 24 need not be machined to provide an extensive guide surface for the piston, and cup member 14 can be formed as a low cost item by the use of low cost stamping, drawing, molding or impact extrusion manufacturing operations.

The embodiment shown in FIGS. 3 and 4 has similar structural and operational characteristics to that of the FIG. 1 embodiment, and similar reference numerals are employed wherever applicable. In the FIG. 3 embodiment there are provided a plurality of "pocket-forming" holes 50. These holes are of sufficiently small diameter (about .030 inch) that when piston 26 is in the FIG. 3 position none of force-transmitting material 30 is enabled to extrude into the holes; the pressure of material 42 is relieved by an upward movement of the piston, i.e. the resistance of the piston to being moved upward is less than the resistance of material 42 to extrude into holes 50. Holes 50 become operative when piston 26 tends to "overtravel" in such manner as to result in parts breakage. Thus, if material 42 should become overheated the device which is actuated by piston 26 would have an overtravel such as to pressure against its mating part in a manner tending to cause parts breakage. This action would put a downward reaction pressure on piston 26; however any downward reaction pressure on the piston would be relieved by an extrusion of material 30 into holes 50 before parts breakage could occur.

The FIG. 5 embodiment is similar to the FIG. 1 embodiment except that force-transmitting body 30 is formed of two separate pieces of material. The operational characteristics of the FIG. 1 and FIG. 5 embodiments are substantially the same.

The FIG. 6 power element includes a cup member 25 which is formed of sintered powdered metal so as to have a "porous" character. The porosity of cup member 25 causes any of ambient medium 29 which might become trapped in the power element to be expelled through the pores in member 25 on the piston out-stroke. As a result the power element tends to retain its calibration over an increased number of cycles.

The FIG. 7 embodiment includes an end wall 24 having a comparatively small guiding surface for the piston. Guiding of the piston is accomplished primarily by plug portion 32. The FIG. 8 cup member 14 can be formed by low cost stamping or drawing operations in the same manner as the corresponding cup member in the FIG. 1 embodiment.

The FIG. 8 power element is similar to the FIG. 1 element except that cup member 14 in the FIG. 8 device is provided with outwardly diverging surfaces 52. These diverging surfaces serve to compress plug section 54 during the piston in-stroke so as to provide a good seal against the entrance of ambient media into the power element. Thus, during the piston in-stroke the piston tends to carry plug section 54 with it. As a result plug section 54 tends to be squeezed at "neck portion" 56 so as to exert a good sealing pressure on the piston and interior cup surfaces.

FIG. 9 illustrates a modification of the FIG. 8 structure wherein the opening in the end wall of cup member 14 is enlarged to aid in defining the diverging surfaces 52. The FIG. 9 embodiment operates in the same manner as the FIG. 8 embodiment except that guiding of the piston is accomplished entirely by the plug with no assistance from the cup member.

The FIG. 10 embodiment includes a cup member 14 having interior surfaces thereof contoured to define a straight walled passage or chamber 58. An anti-extrusion disk 60 is seated in chamber 58 to prevent any of force-transmitting material 30 from extruding into the joint between piston 26 and opening 22 so as to interfere with efficient movement of the piston. Disk 60 may be formed of a number of materials, as for example the materials disclosed in copending application, Serial No. 577,580, filed on April 11, 1956.

The FIG. 11 embodiment is similar to the FIG. 1 embodiment except that interior cup surfaces 46 do not converge toward each other. The "pressure redirection" feature mentioned in connection with the FIG. 1 embodiment is not present to the same degree in the FIG. 11 embodiment, but the FIG. 11 embodiment retains other advantages present in the FIG. 1 structure.

In the FIG. 12 embodiment pressure-producing material 42 is a hydraulic fluid introduced from a remote source through a hydraulic line 60. Pressure changes in hydraulic material 42 are effective on the piston in the same manner as pressure changes caused by volumetric changes of the thermal material in the FIG. 1 embodiment.

It is contemplated that various features in the several disclosed embodiments can be combined with one another to provide power elements of various different operational characteristics.

I claim:

1. In a thermostatic power element, a container including a cup and cap assembly defining an interior space, the cap having an aperture communicating with the interior space, a resiliently deformable plug in said space having an axial recess communicating with the cap aperture, a piston projecting axially of said plug and having a tapered first end bottomed in the recess, said piston having its other end projecting beyond the plug and through the cap aperture, the plug having a medial radially enlarged flange sealingly trapped between the cap and the cup, the plug above the flange constituting a substantial portion of the plug length and being snugly peripherally engaged by the cap, heat-responsive material confined in the cup and surrounding the lower portion of the plug, expansion of said material initially displacing the piston toward the cap as the heat-responsive material squeezes the plug radially inwardly to progressively collapse the plug beneath the lower end of the piston until such time as the piston is displaced axially of the plug to substantially radially align the piston lower end with the medial plug flange, subsequent expansion of the heat responsive material deforming the plug flange upwardly to inwardly collapse the plug above the flange and to close the plug recess above the flange, the piston being displaced upwardly beyond the flange by deformation of the plug after that portion of the plug below the flange has been collapsed, that portion of the plug below the sealing flange being of a length substantially less than the total length of travel of the piston.

2. In a thermostatic power element, a container including a cup and cap assembly defining a sealed interior space, heat responsive material in the cup, the cap having an aperture communicating with the interior space, a resiliently deformable elastomeric plug in said space having an axial recess communicating with the cap aperture, said axial recess terminating short of the lower plug end to form a bulbous lower plug portion axially centralized in said cup in spaced relation to the bottom of the cup, a piston in said plug recess having a tapered lower extremity bottomed in said recess and having its other end projecting through the cap aperture, the plug having a medial, radially enlarged flange sealing the joint between the cap and the cup and confining the heat responsive material in said cup in intimately surrounding relation to the lower end of said plug and the end of said piston bottomed in said recess, said plug having an axially upwardly tapered portion above said flange snugly confined by a correspondingly tapered cap inner surface, said tapered portion constituting a substantial portion of the plug length, expansion of the heat-responsive material confined in the cup initially squeezing the plug radially inwardly to progressively collapse the plug recess and acting on the tapered end of the piston to displace the piston axially of the plug, and subsequent further expansion of said heat responsive material, after the plug is completely collapsed below the flange, compressing the plug against the cap and bodily displacing the plug upwardly toward the cap, the plug portions above the flange then acting directly on the piston to push the piston directly upwardly while closing the plug recess above the flange as the tapered upper end of said plug reacts against the tapered cap inner surface to provide a peripheral seal for the plug.

3. In a thermostatic power element including cap and cup components defining a container closed except for a cap aperture, an elastomeric plug having an exterior peripheral flange sealingly trapped between the cap and cup components, said plug having an axial recess therein aligned with the cap aperture, the plug having a lower sleeve portion depending from the flange into the cup, heat responsive material confined in the cup by the flange to completely surround the sleeve, and the plug having an upper sealing portion lying above the flange and snugly encompassed by the cap, that portion of the plug above the flange constituting a substantial portion of the plug length, and a piston axially displaceable in the plug and having a free lower end bottomed in the plug recess and an upper end projecting through the cap aperture, initial expansion of the material acting directly on the plug sleeve portion and the piston free end to collapse the sleeve inwardly and to thereby displace the piston upwardly by essentially a squeezing action until the piston free lower end enters the upper sealing portion of the plug above the flange, and subsequent further expansion of the material acting directly on the flange to bodily displace the plug upwardly so that the piston is displaced above the level of the flange by essentially a pushing action through a distance substantially in excess of the distance through which the plug is bodily displaced.

References Cited in the file of this patent

UNITED STATES PATENTS

| | | |
|---|---|---|
| 2,208,149 | Vernet | July 16, 1940 |
| 2,507,466 | Craene | May 9, 1950 |
| 2,534,497 | Albright | Dec. 19, 1950 |
| 2,657,711 | Dillman | Nov. 3, 1953 |

FOREIGN PATENTS

| | | |
|---|---|---|
| 531,280 | Great Britain | Jan. 1, 1941 |
| 470,266 | Italy | Mar. 31, 1952 |
| 755,662 | Great Britain | Aug. 22, 1956 |